April 26, 1938.   J. WERNER ET AL   2,115,599
NUT THREADING MACHINE
Filed Aug. 18, 1936   11 Sheets-Sheet 1

April 26, 1938. J. WERNER ET AL 2,115,599
NUT THREADING MACHINE
Filed Aug. 18, 1936 11 Sheets-Sheet 2
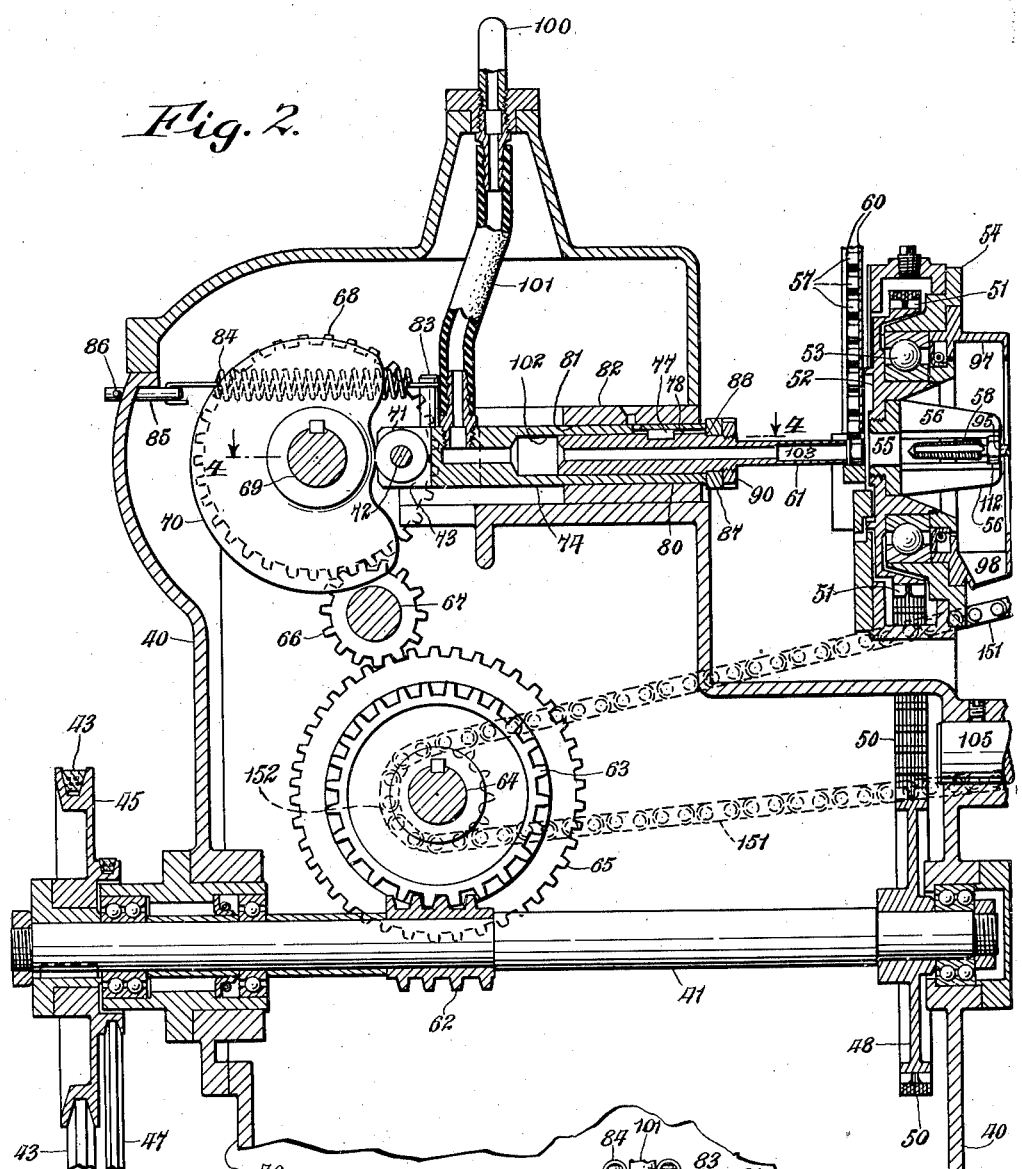
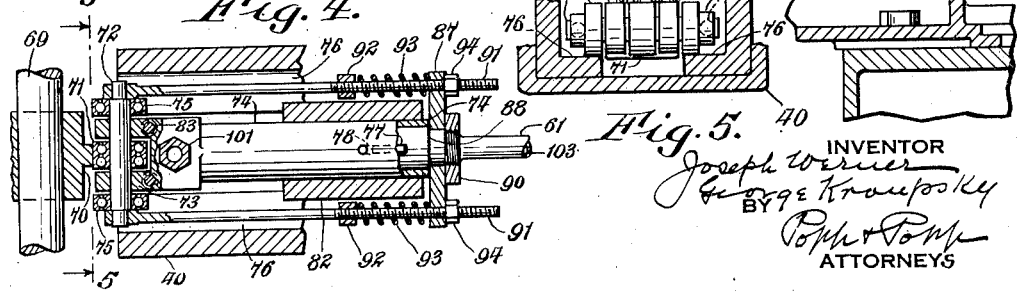

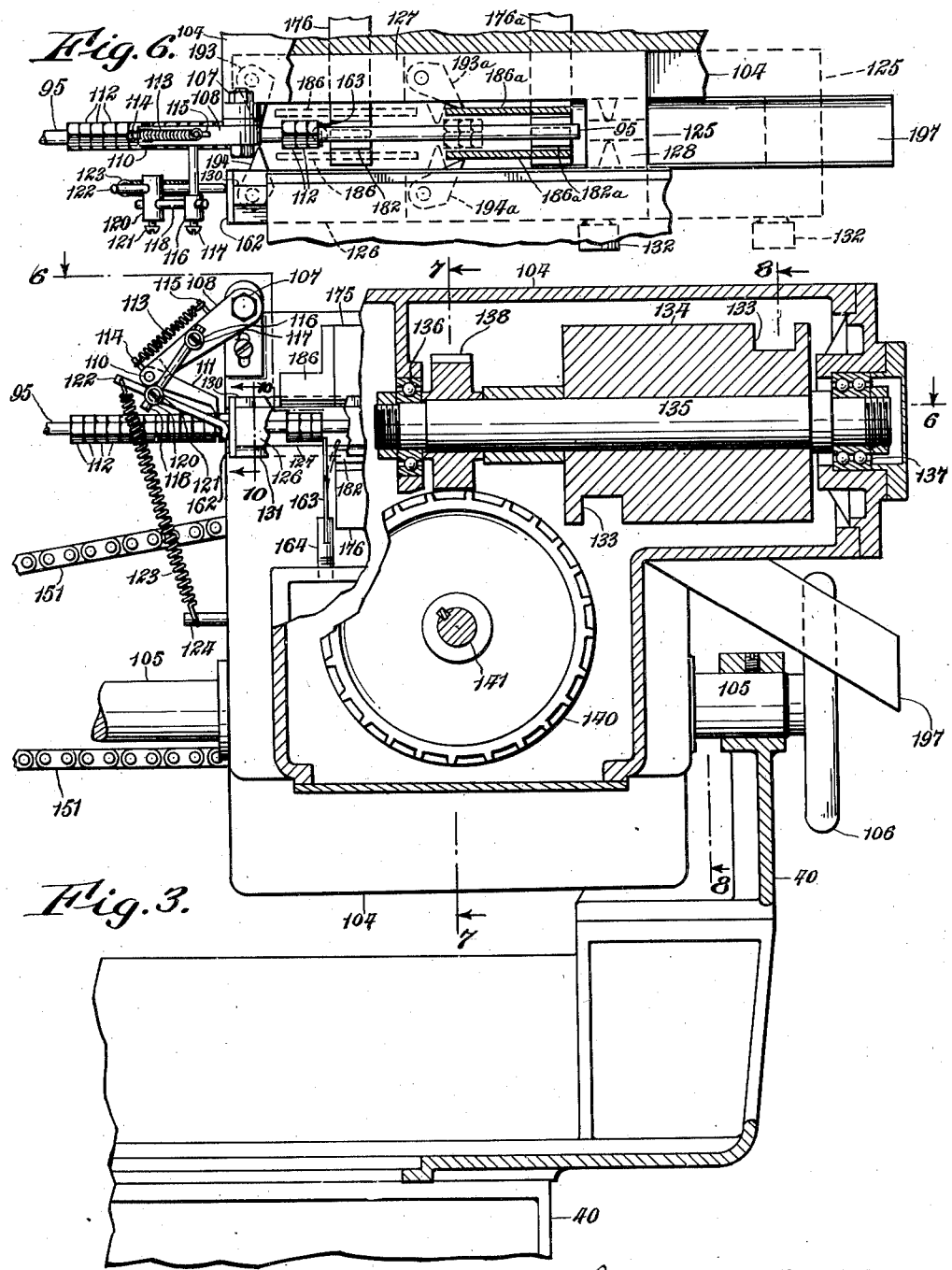

April 26, 1938.    J. WERNER ET AL    2,115,599
NUT THREADING MACHINE
Filed Aug. 18, 1936    11 Sheets-Sheet 4
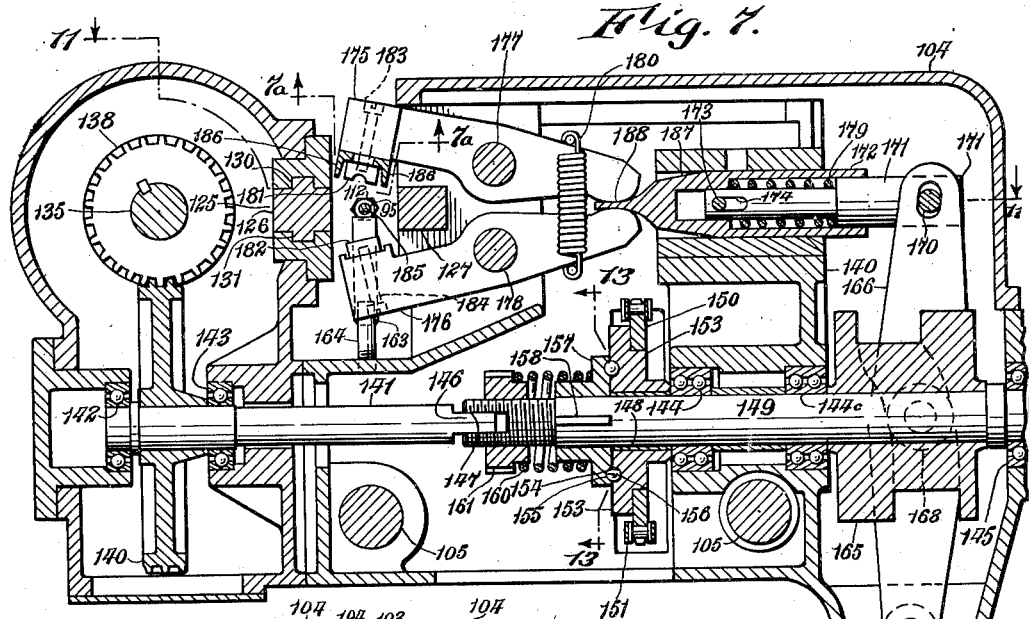
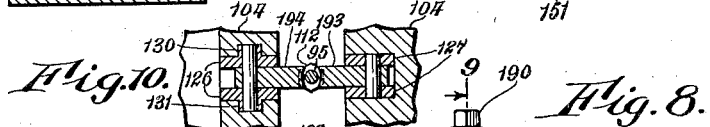
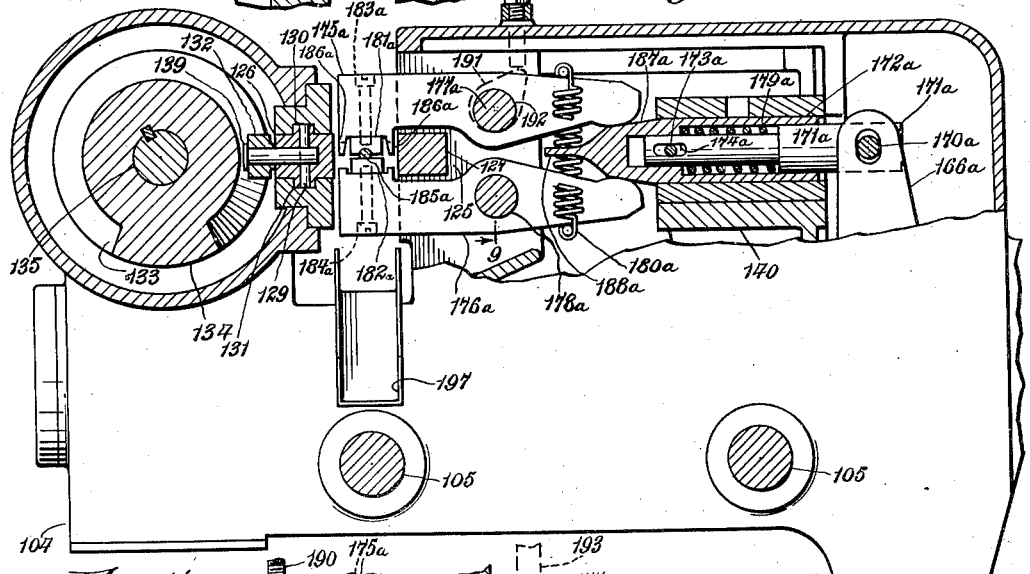
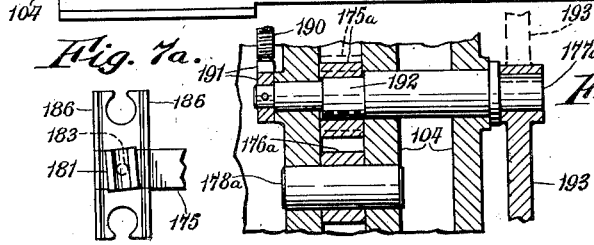
INVENTOR
Joseph Werner
George Traupsky
BY
Popp + Popp
ATTORNEYS

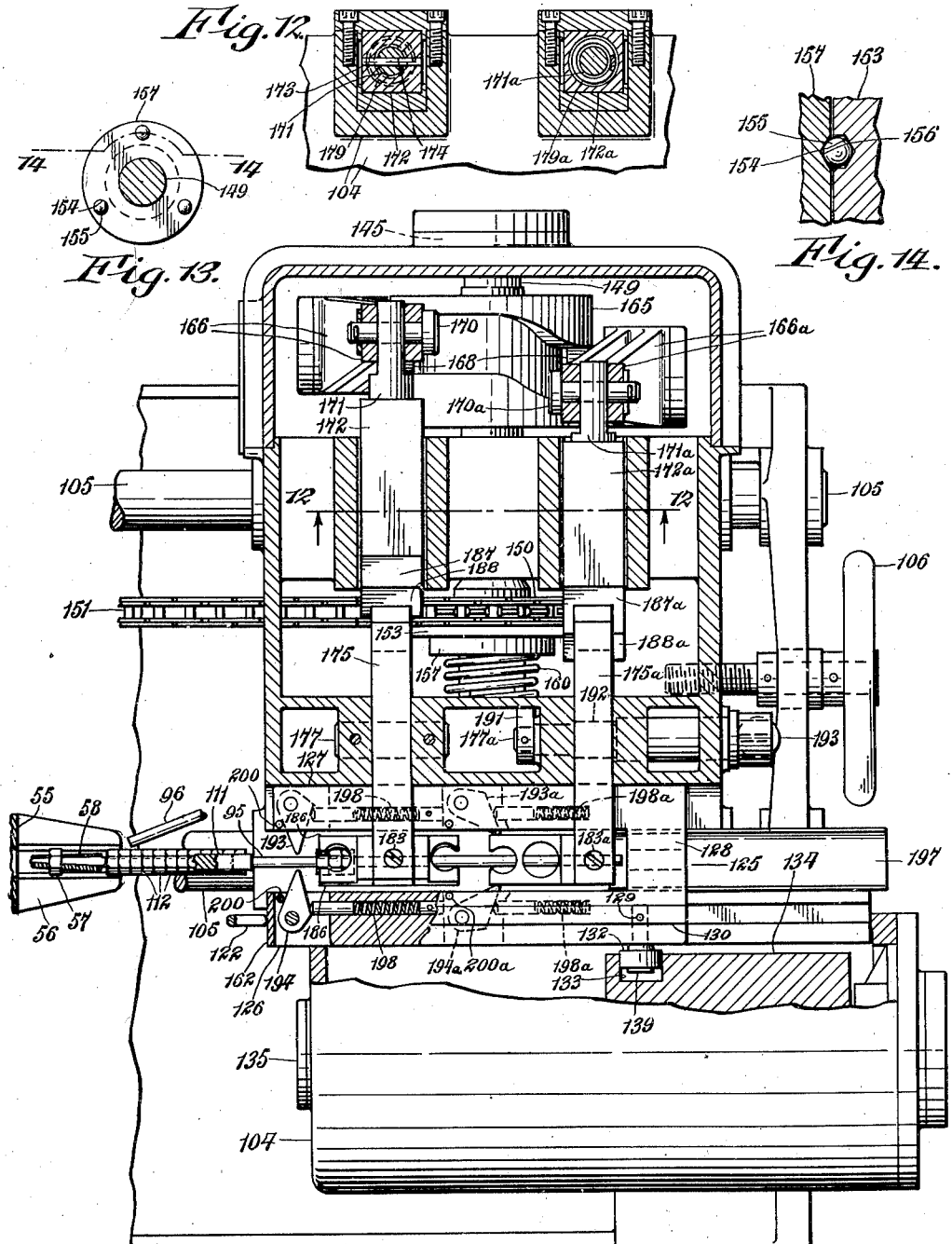

April 26, 1938.  J. WERNER ET AL  2,115,599
NUT THREADING MACHINE
Filed Aug. 18, 1936   11 Sheets-Sheet 6
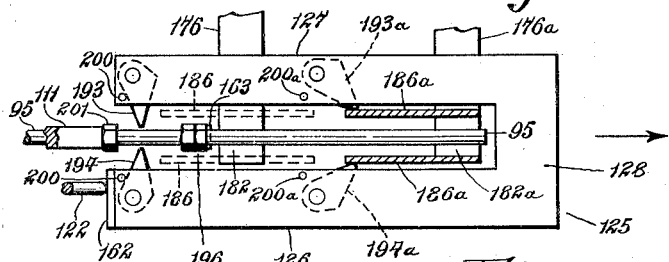
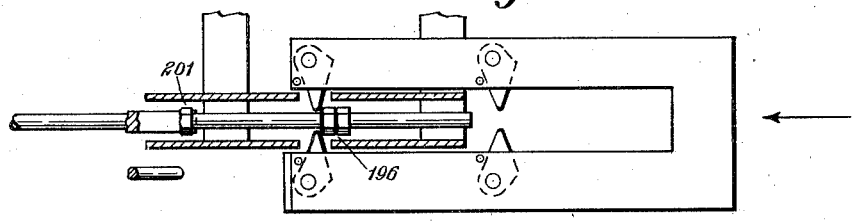
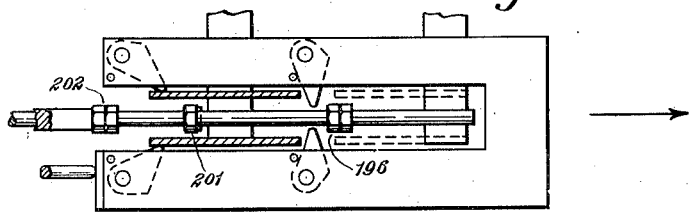
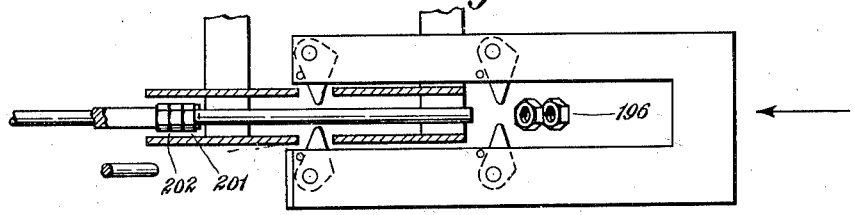
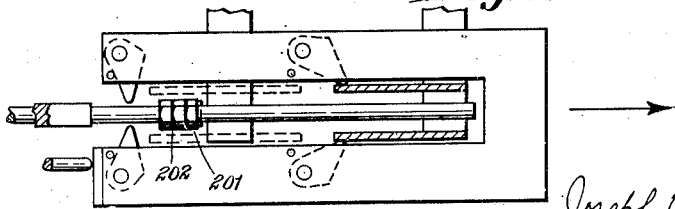

April 26, 1938.   J. WERNER ET AL   2,115,599
NUT THREADING MACHINE
Filed Aug. 18, 1936   11 Sheets-Sheet 7

Joseph Werner
George Kroupsky
INVENTOR
BY Pope & Pope
ATTORNEYS

April 26, 1938.  J. WERNER ET AL  2,115,599

NUT THREADING MACHINE

Filed Aug. 18, 1936   11 Sheets-Sheet 8

INVENTOR
Joseph Werner
George Kroupsky
BY
ATTORNEYS

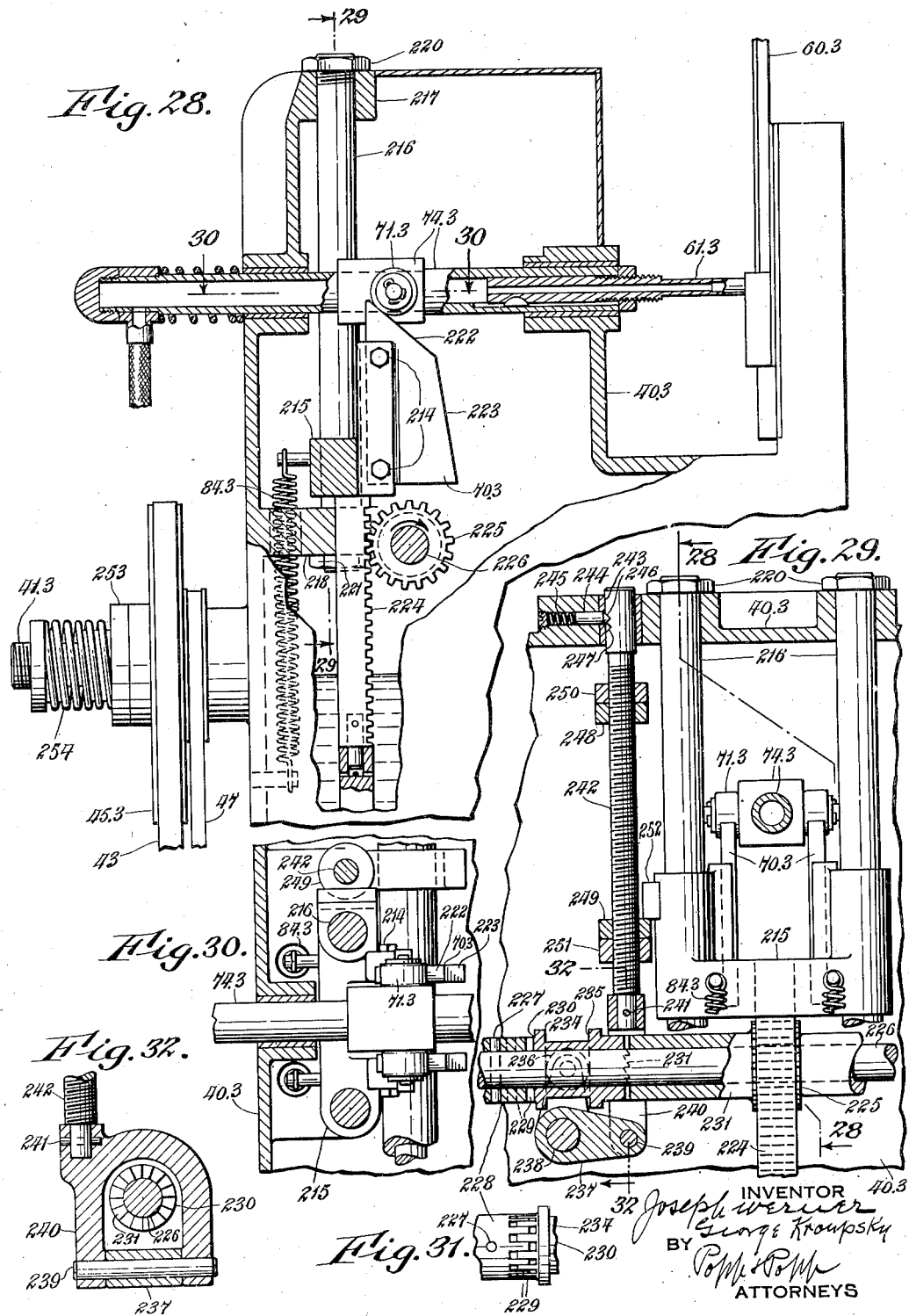

April 26, 1938.  J. WERNER ET AL  2,115,599

NUT THREADING MACHINE

Filed Aug. 18, 1936   11 Sheets-Sheet 10

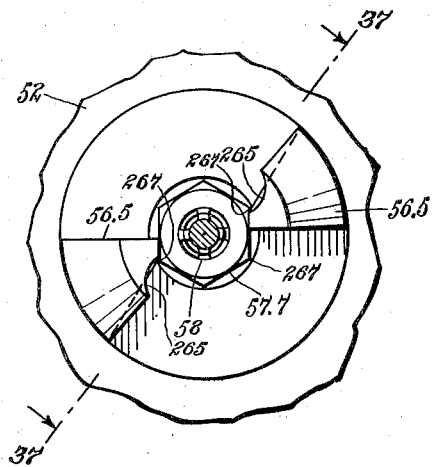
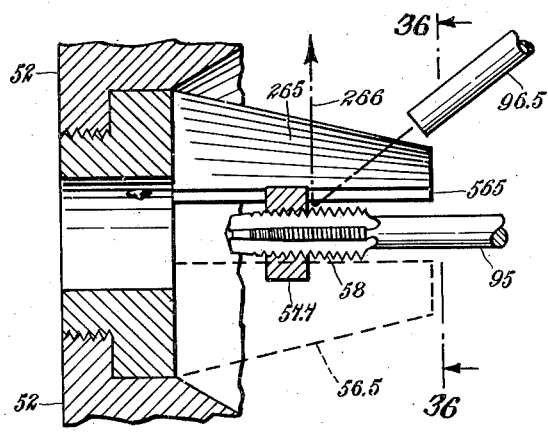
Fig. 36.  Fig. 37.
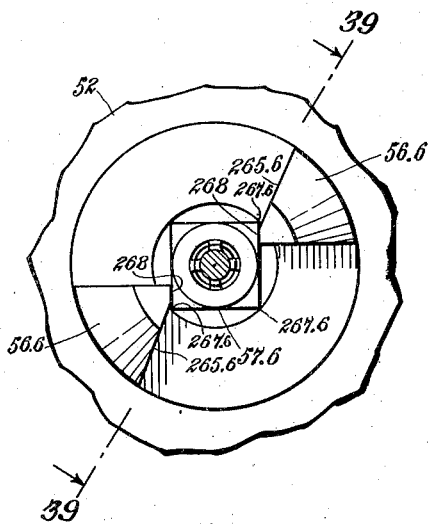
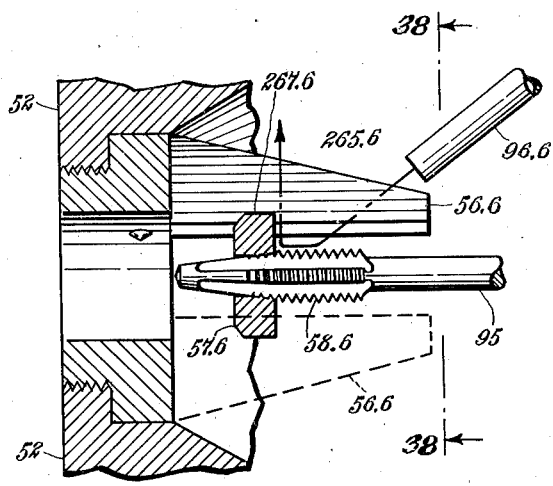
Fig. 38.  Fig. 39.

Patented Apr. 26, 1938

2,115,599

UNITED STATES PATENT OFFICE 2,115,599

NUT THREADING MACHINE

Joseph Werner, Detroit, Mich., and George Kroupsky, New York, N. Y., assignors, by mesne assignments, to The Waterbury Farrel Foundry and Machine Company, Waterbury, Conn., a corporation of Connecticut Application August 18, 1936, Serial No. 96,634

13 Claims. (Cl. 10—133)

The invention relates to a machine for tapping or cutting female screw threads in a previously formed opening, and relates more particularly to a nut tapping machine of the straight tap type for tapping the cylindrical bores of nut blanks so as to form finished, threaded nuts.

The objects of the invention are:

A. To provide an improved means for pushing the nuts one at a time from the supply means through the front part of a rotatable chuck and out the front end of the threaded portion or bit of a tap, in such manner that the nuts are advanced by said pusher with extreme accuracy which is not appreciably affected by the clearance or wear of the various parts.

B. To at first very rapidly push the nuts successively from the supply means to the front end of the bit of a tap, and to thereafter push each nut at a much slower, but very accurately controlled rate of speed over said bit.

C. To provide a nut pushing mechanism which is capable of either positively pushing each successive nut from a supply means to the tap, or optionally applying for a limited range of movement a yielding pressure to said nut, in order to compensate for slight difference which may exist between the lead of the cutters on the bit of the tap and the rate of movement of the nut pusher.

D. To provide a pusher which will carry the oblique, longitudinal thrust of the pusher cam in a most effective manner and also prevent said pusher from cocking laterally.

E. To provide a type of chuck which will positively rotate the nut, and yet provide maximum lateral freedom of movement of the nut.

F. To provide a type of chuck which will be capable of handling either hexagonal or square nuts of any one thread size.

G. To provide a tap which will be so constructed as to permit a large quantity of cutting oil to vigorously wash away the chips as fast as they are cut off from the nut by the threaded bit of the tap.

H. To supply the rear end of the nut turning chuck with a liberal quantity of cutting oil at a point inside the chuck jaws so that the tendency of said jaws to throw said oil radially outward is impeded by the inner faces of the jaws themselves, and to thereby enable a sufficient supply of cutting oil to accumulate inside said chuck jaws to ensure that the tap and the nut being tapped are provided with an adequate quantity of cutting oil and that the chips emanating therefrom are supplied with a sufficient bulk of cutting oil to rapidly carry them away.

I. To prevent the momentum of some of the free moving nuts from moving them an undue distance rearwardly to a danger point where they would do damage, and at the same time permitting all of the nuts to be moved past this danger point at a time, in synchronism with the rest of the machine, when there is no danger.

J. To positively ensure that no nuts will be accidentally positioned under either of the pairs of gripping jaws when the latter close upon the shank of the tap.

K. To positively prevent the stripping fingers from closing at a point adjacent the tap gripping jaws, except when said jaws are open and when, therefore, it is safe to move the nuts along the tap past said gripping jaws.

L. To provide an improved means of closing the two pairs of gripping jaws which alternately grip the shank of the tap so that, said shank may be very powerfully gripped even though very generous machinery tolerances in the dimensions of the various parts are permitted or considerable wear of the parts has taken place.

M. To provide such a shape of gripping jaw as will be both positive in action and easy to align with the axis of the chuck.

N. To provide a type of jaw which can be adjusted to properly grip the shank of a tap even though said shank be somewhat bent.

O. To permit the use of a pivotal connection to drive the stripper carriage from the cross shaft, even though said carriage has a considerably long stroke and is located very close to said cross shaft.

Numerous other objects of the invention and practical solutions thereof are disclosed in detail in the herein specification, wherein.

In the accompanying drawings:

Fig. 2 is a fragmentary, vertical, longitudinal section of the upper front part of the machine, showing the chuck whereby the nuts are turned relatively to the bit of the tap, and one form of the means whereby the pusher is actuated for carrying the nut blanks from the feed device to said chuck and tap.

Fig. 3 is a vertical, longitudinal section of the upper rear part of the machine, showing part of one of the means whereby the nuts, after they are tapped, are separated on the shank of the tap and presented to the means which move the nuts past the tap gripping mechanism and strip the nuts from the tail end of the tap.

Fig. 4 is a horizontal section, taken on line 4—4, Fig. 2 and showing more particularly the means whereby the nut pusher can either be operated solidly, or adjusted so as to impart a limited amount of yielding thrust against the nut pusher during the initial part of its stroke.

Figure 1:
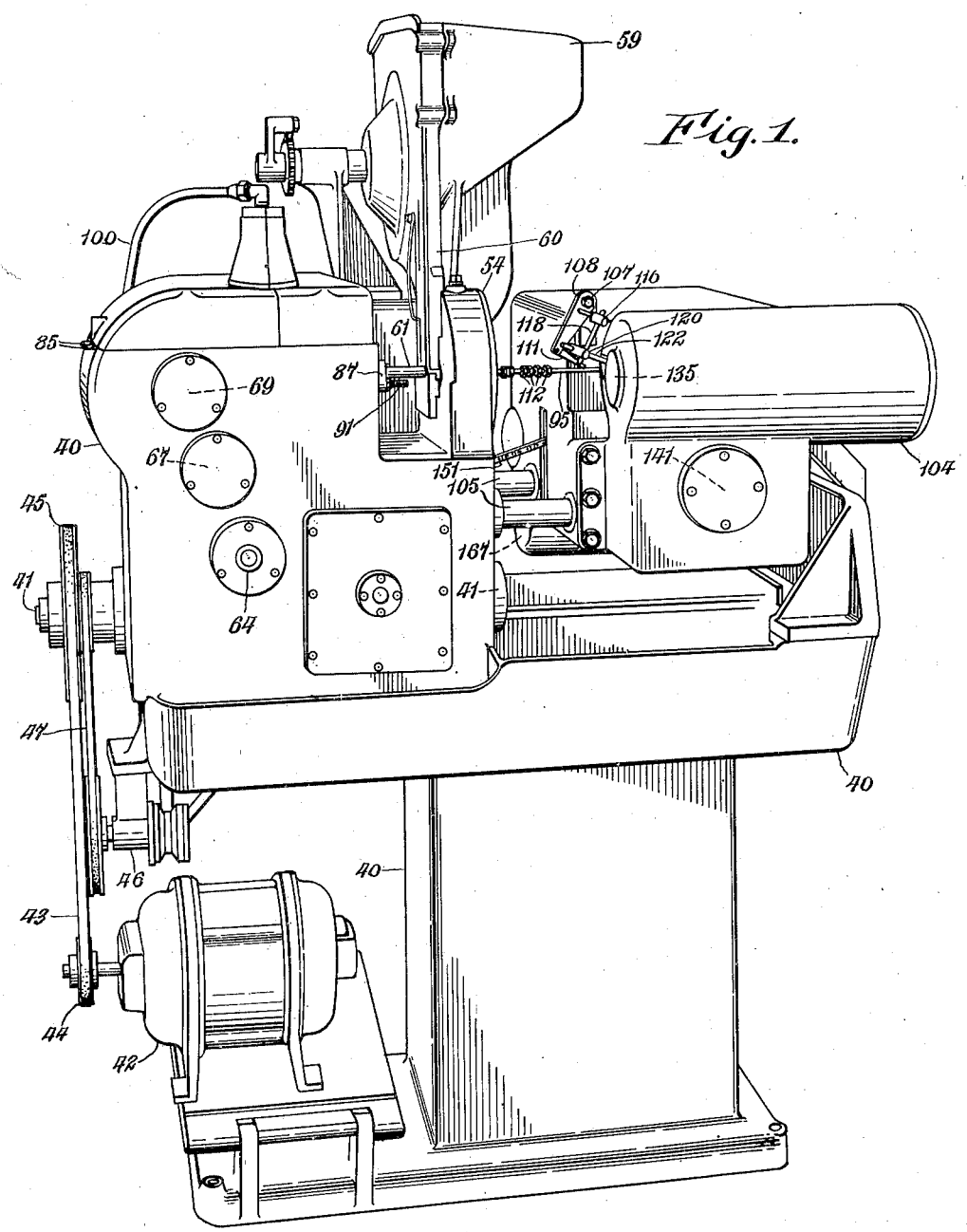
Fig. 1 is a perspective view of the machine as a whole, showing generally the location of the different devices which form the subject of this invention.

Fig. 5 is a vertical section, taken on line 5—5, Fig. 4 and showing more particularly the means whereby the plunger, which actuates the pusher, is able to take the oblique, vertical thrust of the pusher cam, and is also prevented from rocking sidewise, this being accomplished by rollers pivoted on opposite sides of the plunger and running on longitudinal tracks on the adjacent part of the main frame.

Fig. 6 is a sectional top plan view of the mechanism shown in Fig. 3, and taken in line 6—6, Fig. 3.

Fig. 7 is a vertical cross section, taken on line 7—7, Fig. 3 and showing the first pair of tap gripping levers in an open position, also the wedge which actuates said first pair of gripping levers retracted from said levers, and the cam and associated parts for operating said wedge and exerting a yielding thrust against the same.

Fig. 7a is a fragmentary, bottom plan view of the upper jaw of the first pair of gripping levers, taken on line 7a—7a, Fig. 7, showing how the jaw block may be obliquely adjusted to enable the same to properly engage with a bent tap shank.

Fig. 8 is a similar section, taken on line 8—8, Fig. 3 and showing the second pair of tap gripping levers in their closed position, in which position the flat face of the lower holding jaw engages with the flat underside of the tap shank while the upper rounded side of this tap shank is engaged by the semi-cylindrical, concave face of the companion upper jaw.

Fig. 9 is a vertical, longitudinal, section taken on line 9—9, Fig. 8 and showing the eccentric or crank upon which the upper holding lever of the rear pair of gripping levers may be raised and lowered in order to release the tap shank while the latter is released from the front pair of holding levers, this figure showing the stop arm on the eccentric pivot rod and the screw on the frame for limiting the backward movement of said stop arm and thus preventing the thrust on the outer arm of this lever from accidentally rotating said pivot rod into an inoperative position.

Fig. 10 is a fragmentary cross section, taken on line 10—10, Fig. 3 and showing one pair of stripping fingers swung inwardly from the two legs of the stripper carriage and into a position in which they stand in the path of a nut on the shank of the tap and are thus capable of moving this nut lengthwise off the tap shank and past the first pair of gripping jaws.

Fig. 11 is a horizontal section, taken on line 11—11, Fig. 7 and showing mainly the holding mechanism whereby the tap shank is alternately gripped at two different points in the length thereof, and also part of the means for dividing the nuts which are on the tap shank after leaving the bit and feeding them one or more at a time to a position in front of the first pair of gripping levers and also a part of the means for stripping the nuts from the tap shank and moving the same past the gripping levers.

Fig. 12 is a longitudinal section, taken on line 12—12, Fig. 11 and showing the gripper operating wedges in square form, and also the pin and slot connection and the spring means associated therewith.

Fig. 13 is a vertical section, taken on line 13—13, Fig. 7, showing the form of one of the clutch disks or plates whereby the power is automatically thrown off in the event that the machine becomes stuck, so as to avoid breaking of the machine.

Fig. 14 is an enlarged fragmentary section, taken on line 14—14, Fig. 13 and showing one of the clutch balls engaging with companion recesses on the two clutch plates, one recess being deep and adapted to retain the ball at all times while the other recess is shallow and adapted to be disengaged from the respective clutch ball.

Figs. 15—19 are diagrammatic top plan views of the main elements of the stripping mechanism whereby the tapped nuts are moved step by step past the two pairs of gripping levers which hold the tap. These figures also show part of one form of the dividing mechanism which operates to divide or separate some of the nuts from the row of nuts, which has accumulated on the shank of the tap after passing the bit of the tap, and advances said nuts within reach of the nut stripping mechanism.

Figure 20:
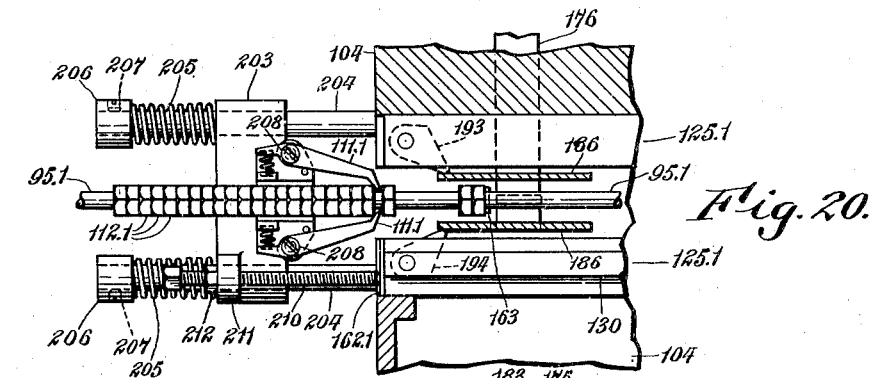
Figure 21:
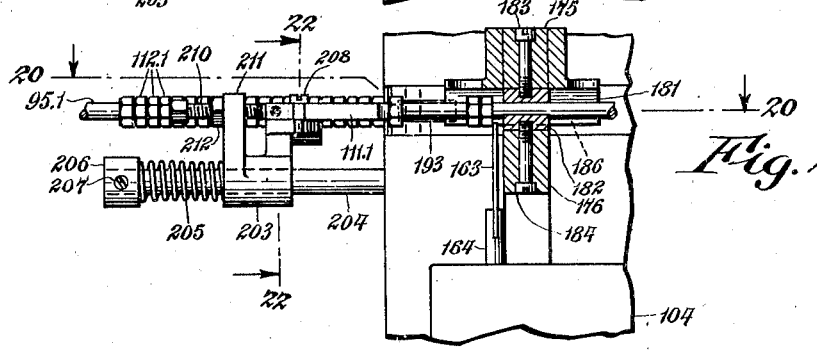

Fig. 20 is a fragmentary, sectional, top plan view, similar to Fig. 6 but showing a modified form of dividing finger, taken on line, 20—20 Fig. 21.

Fig. 21 is a fragmentary, vertical, longitudinal section thereof.

Figure 22:
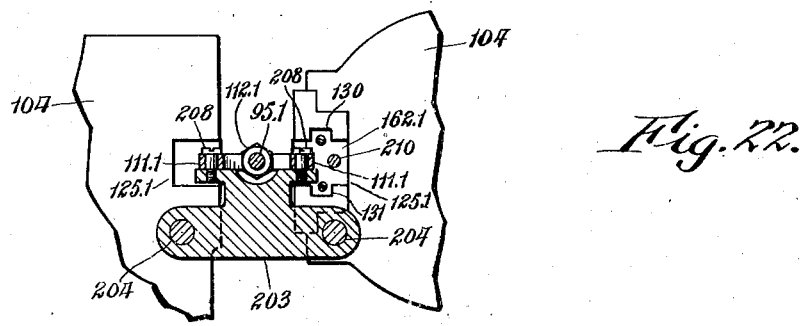

Fig. 22 is a fragmentary, vertical, transverse section thereof, taken on line 22—22, Fig. 21.

Figs. 23—27 are diagrammatic top plan views, similar to Figs. 15–19, but showing the nut stripping mechanism in combination with a modified form of nut dividing means, whereby the nuts are advanced along the shank of the tap from the rear of the threading bit of said tap to the first pair of gripping levers and into the path of the first pair of stripping fingers.

Fig. 28 is a fragmentary, vertical, longitudinal section, similar to Fig. 2, but showing a modified form of cam and associated mechanism for advancing the nut pusher positively and retracting the same by spring pressure.

Fig. 29 is a vertical, transverse section of the same, taken on line 29—29, Fig. 28.

Fig. 30 is a horizontal section, taken on line 30—30, Fig. 28, and showing more particularly the means for vertically guiding the carriage, which carries the two cams whereby the nut pusher is moved forwardly, and also the springs for lowering this carriage.

Fig. 31 is a top plan view of the splined connection between the driving shaft which is shown in Fig. 29 and the movable member of the clutch forming part of the pusher actuation mechanism.

Fig. 32 is a vertical transverse section, taken on line 32—32, Fig. 29, showing in detail the clutch whereby the driving shaft is connected with and disconnected from the gear pinion which meshes with the gear rack of the pusher operating mechanism.

Figure 33:
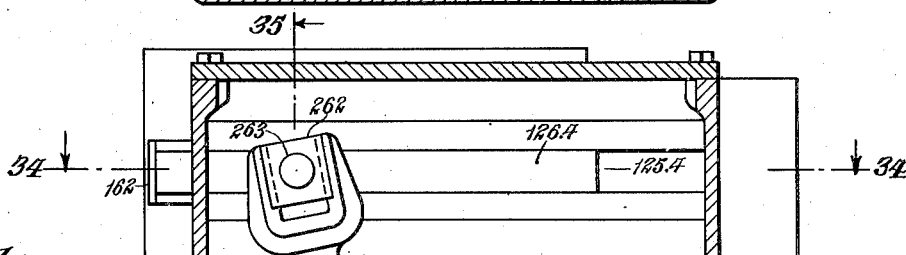

Fig. 33 is a fragmentary vertical longitudinal section, corresponding to Fig. 3 and showing a lever mechanism for actuating the stripper carriage.

Figure 34:
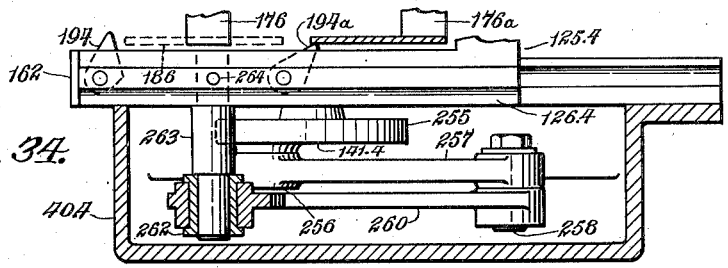

Fig. 34 is a horizontal section thereof, taken on line 34—34, Fig. 33.

Figure 35:
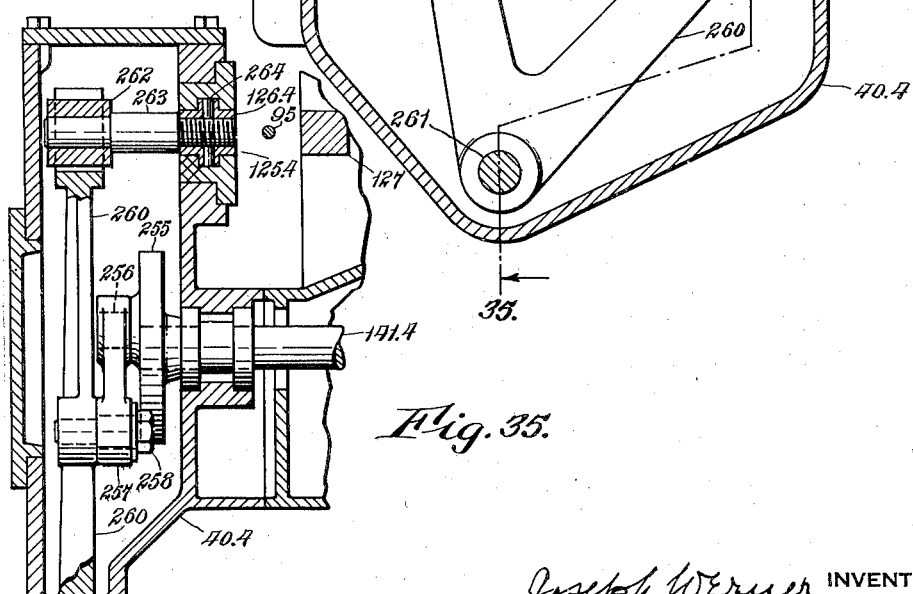

Fig. 35 is a vertical transverse section of said stripper actuating mechanism, taken on line 35—35, Fig. 33.

Fig. 36 is a rear end elevation, on an enlarged scale, of a modified form of driving chuck, taken on line 36—36, Fig. 37.

Fig. 37 is an oblique, longitudinal section thereof, taken on line 37—37, Fig. 36.

Fig. 38 is a rear end elevation, on an enlarged scale, of still another modified form of driving chuck, taken on line 38—38 Fig. 39.

Fig. 39 is an oblique, longitudinal section thereof, taken on line 39—39, Fig. 38.

In its general organization the present invention of the form shown in Figs. 1-19 includes a hopper 59 which is periodically filled with a supply of nut blanks 57, and from which hopper said nut blanks slide down through an alignment channel 60, and are pushed rearwardly, one by one, from the open lower end of said channel by a pusher 61 into a rotating, driving chuck 55. While thus being rotated by said chuck, each successive nut blank continues to be pushed by said pusher 61, and is thereby caused to move into engagement with the threaded bit 58 of a straight shanked tap. This causes said nut blanks to be threaded, and the resulting threaded nuts 112 then accumulate on the shank 95 of the tap. Successive groups of these threaded nuts (for instance group 196) are then moved rearwardly by a dividing finger 111 which is pivoted at 110 to a rock arm 108 and is indirectly actuated by a carriage 125 which reciprocates in the tail stock 104 of the machine. A primary pair of stripping fingers 193, 194 pick up the group of nuts 196 which have been moved forwardly by the dividing finger 111 and move them past a pair of primary tap gripping jaws 181, 182 which at this time are open but intermittently grip the shank 95 of the tap to restrain said tap against both rotary and longitudinal movement. In a similar manner and in proper synchronism with the rest of the machine, a pair of secondary stripping fingers 193a, 194a move the group of nuts 196 past a secondary pair of gripping jaws 181a, 182a and push them off the rear end of the shank 95 of the tap, where they fall down a chute 197 and are thence removed periodically from the machine.

*Detailed description of threading mechanism*

Journaled horizontally and longitudinally in the front part of the main frame 40 of the machine is a drive shaft 41, as best shown in Figs. 1 and 2. This drive shaft may be driven in any suitable manner as, for instance, by the electric motor 42 and V drive belt 43, the driving pulley 44 of the motor being preferably considerably smaller than the driven pulley 45 of the drive shaft 41 so as to permit the use of an ordinary, high speed electric motor without providing an excessively high rotative speed to the drive shaft 41. In a similar manner the drive shaft of the cutting-oil pump 46 is caused to rotate at sufficiently low rate of speed by being suitably belt driven by the belt 47 from the drive shaft 41.

The rear end of said drive shaft 41 is suitably secured to a driving sprocket 48, preferably of the gear toothed, "silent" chain type, around which is passed the lower end of a "silent" chain belt 50. The upper end of said chain belt passes around a driven sprocket 51 which is integrally formed on the periphery of a rotary driving head 52. The latter is preferably journaled on a single ball bearing 53 in a bearing housing 54 which is suitably connected to the main frame 40 of the machine. Screwed into the bore of said rotary driving head 52 is a driving chuck 55 having a plurality of rearwardly extending driving arms 56 which are adapted to engage with the corners of a succession of nut blanks 57 and to rotate said blanks relatively to the threaded bit 58 of a straight shanked tap.

These nut blanks 57 are poured into the hopper 59 of the machine, and slide down by gravity through a vertical alignment channel 60, the lower rear end of which is open to permit the lowermost nut blank to be pushed rearwardly through the bore of the chuck 55 and upon the front end of the threaded bit 58 of the tap. This rearward movement of each successive nut blank is effected by a pusher 61 which is actuated as follows:

Secured to an intermediate part of the drive shaft 41 is a worm 62 which meshes with a worm wheel 63 secured to a jack shaft 64 which is journaled horizontally and transversely in the main frame of the machine. This worm and worm wheel power connection cause said jack shaft 64 to rotate very considerably slower than the drive shaft 41. Secured to said jack shaft 64 is a spur gear 65 which meshes with a spur pinion 66 mounted on an intermediate shaft 67 suitably journaled horizontally and transversely in the main frame 40 of the machine. This spur pinion 66, in turn, meshes with a cam-driving spur gear 68 which is secured to a cam shaft 69 that is journaled horizontally and transversely of the machine and has secured to its central part a heart shaped cam 70. These gears 65, 68 and intermediate pinion 66 merely serve to transfer the power from the jack shaft 64 to the cam shaft 69 without any change of speed.

Said cam 70 contacts with and actuates an anti-friction roller 71 which is journaled on a horizontal cross pin 72 (see Fig. 4) and the latter is secured at its opposite ends in the forwardly-extending bifurcated arms 73 of a pusher sleeve 74. Outwardly of the outer faces of the said bifurcated arms 73, said cross pin 72 has journaled thereon a symmetrically disposed pair of guide thrust rollers 75, which roll upon a pair of guideways 76 formed horizontally and longitudinally on the main frame 40 of the machine.

It is to be noted that the central plane of the cam 70 intersects the axis of the pusher 61, and also that the axis of rotation of said cam intersects the axis of the pusher. Because of this construction the movement of the pusher will always be in exact accordance with the surface of the cam which is at the moment in contact with the roller 71 and this will be true irrespective of the clearance in or the wear of the various bearings which are associated with this pusher mechanism. In addition to this, the oblique thrust against the pusher sleeve 74 is reduced to the lowest practicable minimum, so that wear on said pusher sleeve is reduced to the minimum.

In pusher mechanisms heretofore constructed, the various members have not been in line with the axis of the pusher, and, as a consequence, the clearance in and the wear of the bearings has caused slack movements which have, in actual practice, been found to vary in the direction in which they act and to be not positively amenable to any type of control because of the fact that the pressure exerted against the various bearings vary considerably in their angle of thrust. In the present invention all angles of thrust remain substantially constant, and hence the actuation of the pusher 61 is very accurate even when the machine has been in continuous service during a long period of time. It is to be understood that these matters are not particularly important when tapping, for instance, class 1 nuts which have large dimensional tolerances, but they are very important when tapping class 4 nuts. It also follows that such a construction as here disclosed and found particularly desirable for tapping fine tolerance nuts, can be employed to advantage in cutting large tolerance nuts. These rollers serve to both take the oblique longitudinal thrust of the cam 70 against the roller 71 and to prevent the pusher sleeve 74 from cocking laterally as a consequence of the tendency of the rotational frictional contact between the rear face of the pusher 61 and the front face of the rotating nut blank 57 being tapped.

The rear end of the pusher sleeve 74 is coaxially bored out to receive the cylindrical, large front end of the pusher 61. Said pusher 61 and said pusher sleeve 74 are prevented from rotating relatively to each other by a Pratt and Whitney type of countersunk key 77 which engages a keyway shaped spline 78 which is suitably formed in the bore of the pusher sleeve 74. Said pusher sleeve is held laterally in alignment with the chuck 55 and with the threaded bit 58 of the tap by having the peripheral surface of its rear end 80 of cylindrical shape and slidably received within a cylindrical guide 81 formed in a guide block 82. The latter is secured to the main frame of the machine in any desired manner.

Secured to the front end of the pusher sleeve 74 are a pair of symmetrical posts 83 to the upper ends of which are secured a pair of horizontal longitudinal tension springs 84 (see Figs. 2, 4, and 5). The front ends of said springs are secured to a pair of hold-back pins 85 which pass through suitable holes in the main frame of the machine and are restrained against rearward movement by a pair of cotter pins 86.

Thus, as the cam 70 rotates away from the position shown in Fig. 2, it thrusts the pusher sleeve 74 and the pusher 61 rearwardly and thereby pushes the nut blank 57, which is at the bottom of alignment channel 60, rearwardly through the front part of the rotating driving chuck 55 and onto the front end of the threaded bit 58 of the tap.

As the nut blank passes into the front end of said chuck it is caused to be turned in such a circumferential position as to be properly presented to the arms 56 of the chuck. This operation is well known in the art and has, therefore, been deemed not necessary to illustrate in the present invention.

After the nut blank has been pushed as far rearwardly as may have been found empirically to be expedient, the cam 70, while continuing to rotate in the one direction, returns to the position of Fig. 2, and the pusher sleeve 74 is thereby permitted to be retracted under the influence of the tension springs 84. When this retractive movement of the pusher sleeves 74 occurs the pusher 61 is also retracted.

It has been found highly desirable, in actual practice, to positively force the nut blanks 57 upon the threaded bit 58 of the tap, so that the movement of said nut blank will be in exact accordance with the pitch of the threads of said threaded bit. On the other hand there may be, in actual practice, a very slight differential between the speed of movement of the pusher 61 and the rotative speed of the chuck 55 (in terms of the pitch of the threads of the threaded bit 58). Hence the present invention includes means whereby a very small, limited resilience may be inserted between the pusher 61 and pusher sleeve 74, this means being adjustable both as to the amount of movement permitted, and also the amount of tension imposed. The construction is as follows:

The intermediate part of the pusher 61 has rigidly connected thereto a cross bar 87. This connection is effected by reducing the diameter of the pusher to form the annular shoulder 88 and rigidly pressing said cross bar 87 against said shoulder by a jamb nut 90 which is threaded onto the pusher at a point just rearwardly of said cross bar 87. The outer ends of said cross bar receive the rear threaded ends of a pair of symmetrically arranged, horizontal, longitudinal, limiting tie rods 91. The front ends of said tie bars are secured to the outer ends of the cross pin 72 located at the front end of and secured to the pusher sleeve 74. Adjustably threaded on the central part of each tie rod 91 is a tension adjusting nut 92, and received between the rear face of said adjusting nut and the front face of the cross bar 87 is a compression spring 93. Threaded onto the rear end of each tie rod is a pusher-movement-limiting adjusting nut 94. When both of these nuts are drawn up tight as shown in Fig. 4 the front face of the cross bar 87 is held firmly against the rear end of the pusher sleeve 74.

Under these conditions the pusher 61 and the pusher sleeve 74 move as a unit, and there is no resilient connection between the cam 70 and the pusher 61 during the time that said pusher is being moved rearwardly. If, however, the adjusting nuts 94 are slacked off a certain desired small amount, then, when said cam 70 starts to force the pusher sleeve 74 forwardly, the pusher 61 will only be correspondingly actuated if the resistance to its movement is insufficient to overcome the resistance of the compression springs 93. If the rearward movement of the pusher is faster than that required for the particular speed of rotation of the nut being tapped, in combination with the pitch of said nut, then the springs 93 will give slightly, and will allow the nut blank to slightly lag behind the pusher 61. The adjustment of the spring tension of the springs 93 is adjusted by adjusting the nuts 92.

After each nut blank 57 has been pushed a sufficient distance rearwardly upon the threaded bit 58 of the tap, further rearward movement of the nut blank is effected by the threads which have already been cut in its bore. This causes each nut blank to continue to move rearwardly (being turned meanwhile relatively to the threaded bit 58 by the arms 56 of the driving chuck 55) until it drops off from the threaded bit 58 onto the shank 95 of the tap, as best shown in Fig. 11.

While the nut blank 57 is being pushed over the bit 58 of the tap, the thread cutting operation, which ensues produces a quantity of chips which should be removed just as fast as they are formed as otherwise inaccuracies in the thread cutting are liable to result. In the present invention each nut blank is constantly supplied with a copious quantity of cutting oil at both its rear and its front face, supplied by the cutting oil pump 46.

The cutting oil to the rear face of the nut blank being threaded is supplied from an oil nozzle 96 suitably connected to said oil pump 46. This nozzle is so aimed that the cutting oil is fed in the space between the inner faces of the arms 56 of the driving chuck 55 and the peripheral surface of the threaded bit 58 of the tap. The aiming of this rear stream of cutting oil is effective in that not only is the stream of oil from said nozzle 96 not splashed laterally by the arms 56 of the driving chuck but, on the contrary, any tendency of the cutting oil to pass out from this annular space within said arms 56 is resisted by the inner faces of said arms. The consequence of this resistance is that a considerable body of cutting oil pressure is built up within said arms 56 and, in addition, the space within said arms liberally filled up with cutting oil. Ultimately, of course, this cutting oil must escape, but this impeding of its escape enables a large quantity of cutting oil at high pressure to be driven against the rear face of the nut blank being tapped, and this solid body of oil enabled to carry away the chips bodily and at high speed as fast as they occur. As the centrifugal force of the driving chuck 55 throws out this body of cutting oil with its chips, both said oil and said chips are caught by an annular trough 97 from whence they escape downwardly, under the influence of gravity, through a vent spout 98.

The cutting oil pump 46 also supplies a constant stream of cutting and cooling oil to a feed pipe 100 (see Figs. 1 and 2) whose upper end is secured to the main frame of the machine and conveys the cutting oil into a flexible hose 101. The latter conveys the oil into the front hollow end 102 of the pusher sleeve 74 from whence it flows rearwardly into the hollow bore 103 of the pusher 61 and thence directly against the front face of the nut being pushed rearwardly by said pusher over the threaded bit 58 of the tap.

*Nut dividing or starting mechanism*

Arranged at the rear end of the machine is a tailstock 104 which is longitudinally slidable on a pair of rail bars 105. The longitudinal position of said tail stock is adjustably regulated by means of a hand wheel 106 (see Fig. 3) which is arranged in the usual and well known manner to enable said tail stock to be moved to whatever longitudinal position may be desired.

Pivoted at 107 to the front upper corner of said tailstock is a rock arm 108. Pivoted at 110 in the lower end of said rock arm is a dividing or starting finger 111 which extends rearwardly and downwardly therefrom and has its lower end or nose so shaped as to enable it to properly engage with and push rearwardly such threaded nuts 112 as have accumulated on the shank 95 of the tap just rearwardly of the threaded bit 58 of said tap. The lower end or nose of this dividing finger 111 is constantly urged downwardly into contact with the nuts by a tension spring 113 whose front end is connected with a pin 114 extending upwardly from said dividing finger 111 while its rear end is secured to a pin 115 projecting upwardly from the rock arm 108.

Adjustably secured by an adjusting head 116 and a set screw 117 to the central part of said rock arm 108 is a stop bar 118. The latter extends downwardly or forwardly from said adjusting head 116 and is adjustably connected at its lower end by a similar adjusting head 120 and set screw 121 with a stop arm 122. This stop arm is resiliently urged rearwardly by a tension spring 123 whose upper end is connected with the projecting portion of said stop arm 122 while its lower end is secured to a pin 124 which projects horizontally forward from the front transverse face of the tail stock 104.

Horizontally and longitudinally slidably arranged in said tail stock 104 is a stripper carriage 125 (see Figs. 15, 13, 7 and 8) which, as viewed from above, is of U shape having its legs 126 and 127 disposed horizontally longitudinally and integrally connected together at their rear end by a connecting bar 128. The one leg 127 of this carriage is of plain rectangular form, while the other leg, 126, is provided at its upper and lower faces with a pair of suitable, longitudinal side tongues 130, 131 which engage with suitable longitudinal grooves in the tail stock and thereby prevent lateral displacement of the carriage relatively to the tail stock.

Projecting laterally outward from the one leg 126 of said carriage 125 and secured thereto by a pin 129 (see Fig. 8) is a stud 139 upon which is journaled an anti-friction roller 132. This roller rolls in the curvilinear track 133 (see also Figs. 3 and 6) of a sewing machine type of cam 134. The latter rotates on a horizontal, longitudinal axis on a shaft 135 which is suitably journaled at its opposite ends on bearings 136, 137 arranged in cross webs of the tailstock 104.

Secured to said shaft 135, forwardly of said cam 134, is a spiral pinion 138 which meshes with a spiral gear 140 secured to a driven cross shaft 141. The latter is suitably journaled horizontally and transversely in the tail stock 104 in bearings 142, 143 as best shown in Fig. 7.

This driven cross shaft 141 is axially in line with a driving cross shaft 149 which is journaled transversely in the tailstock 104 in suitable bearings 144, 144c and 145. The one end of said driven cross shaft 141 is provided with a coaxial, flat, driving tongue 146 which engages with a driving slot 147 cut transversely in the companion end of the driving cross shaft 149. This tongue and slot connection affords a positive driving connection between the driving cross shaft 149 and the driven cross shaft 141 and yet permits certain assemblies of the machine to be removed without necessitating the disassembly of both of said cross shafts.

Journaled adjacent one end of said driving cross shaft 149, on a bearing 148, is a driven sprocket wheel 150 around which passes the rear end of a chain belt 151. The front end of said chain belt passes around and is driven by a driving sprocket wheel 152 (see Fig. 2) which is secured to the jack shaft 64 previously described.

The driving connection between the driven sprocket wheel 150 (see Fig. 7) and the driving cross shaft 149 is of the non-positive type and is constructed as follows:

Secured coaxially to the driven sprocket wheel 150 is a hub member 153 in which (see Figs. 14, 13 and 7) are longitudinally and symmetrically drilled a plurality of relatively deep retaining holes 154 each of which contains a driving ball 155. Similar but more shallow engaging holes 156 are drilled into a driven collar 157. The latter is prevented from rotating on the driving cross shaft 149 by the provision of a spline 158, but is capable of sliding lengthwise thereon. Said driven collar 157 is resiliently urged toward the hub member 153 by a compression spring 160, the tension of which is rendered adjustable by an adjusting nut 161 that is threaded onto the driving cross shaft 149.

By means of this construction, the driven sprocket wheel 150 is able to normally drive the driving cross shaft 149. If, however, an accident should occur, and this driving cross shaft 149 meets with undue resistance, then the driving balls 155 thrust the driven collar 157 outwardly against the tension of the spring 160 and thereby disconnect the power, and prevent breakage of the machine. When the power is thus disconnected, said driven collar 157 is caused to jiggle back and forth, and this causes a sufficient noise and clatter to call the attention of the operator to the fact that something is amiss. At the same time there is no danger that the balls 155 will become disarranged, because the retaining holes 154 are considerably deeper than the engaging holes 156.

The power connection just described causes the carriage 125 to be reciprocated back and forth longitudinally. Every time it moves toward the front limit of its stroke (full line position in Figs. 6, 3, 11, 15 and 17), a butt plate 162, which is secured to the front end of its leg 126, strikes against the rear end of the stop arm 122 and swings the rock arm 108 and its pivot 110 forwardly, thereby retracting the dividing finger 111. Thereupon, when the carriage moves rearwardly, said dividing finger pushes rearwardly such nuts as may happen to be positioned rearwardly of it. This action thereby separates a group of nuts from the rear end of the row of nuts on the tap shank, and moves this group rearwardly and thereby forms a gap between this group of nuts and the row of nuts. If, for any reason, the foremost nut of the group of nuts should be carried only partway along, and then left behind, this nut will be returned in a forward direction when the dividing finger moves forwardly on its idle stroke. This ensures that there will be a definite gap between the separated group of nuts and the row of nuts left behind, and that the rear end of this gap will be at the front end of the group of nuts.

The numeral 163 represents a resilient stop arranged in the path of the screw nuts adjacent to the front side of the front pair of tap gripping or holding jaws 181, 182 which will be described more fully later on. This stop is preferably mounted on the upper end of a post 164 which has its lower end threaded into the tailstock 104 of the main frame, as shown in Figs. 3 and 21. The stiffness or strength of the resilient stop is less than the strength of the spring 123 which operates to move the screw nuts rearwardly on the shank of the tap. When therefore a nut is moved rearwardly positively by the stripping mechanism, which will be hereinafter described, from a position in front of the front tap holding jaws 181, 182 to a position in rear of the same, then the resilient stop will yield and permit the respective nut to pass rearwardly of the tap shank. If, however, a nut is kicked rearwardly with considerable force by the starting or dividing finger 111 owing to the momentum of the rearwardly moving rock arm 108 and associated parts then this nut will be arrested by the yielding stop and prevented from being thrown into the mouth of the jaws 181, 182 while the latter are open and permitting the same to close for holding the tap shank.

*Tap gripping or holding mechanism*

Secured to the driving cross shaft 149, as best shown in Figs. 7 and 11, is a gripping-lever, sewing machine cam 165. This cam operates two upright levers 166 and 166a which are fulcrumed at their lower ends on a pivot pin 167. The latter is suitably arranged in the lower part of the tailstock 104 and is positioned horizontally and longitudinally, thereby allowing the levers 166, 166a to swing in parallel planes which are vertical and transverse of the machine. Anti-friction engagement of the central part of said levers by the sewing machine cam 165 is effected by providing each lever with a suitable roller 168 which rolls in the irregular, curvilinear track of said cam and imparts an appropriate movement to the levers. Inasmuch as both of these levers are actuated by the one cam, it follows that their movement relatively to each other is very positive and reliable.

The upper ends of these levers 166, 166a are preferably bifurcated, as shown in Fig. 11, and are suitably slotted, as shown in Figs. 7 and 8, to receive companion thrust pins 170, 170a. Each of these pins is disposed horizontally and longitudinally in the outer end of a companion plunger 171, 171a. Each plunger is slidably arranged in a companion wedge 172, 172a, but is limited as to this sliding movement by limiting pins 173, 173a, each of which is secured at its opposite ends (see Fig. 12) to its companion wedge, and is centrally received within a companion slot 174, 174a formed in the inner end of the companion plunger 171, 171a.

Surrounding the inner end of the plungers 171, 171a and bearing against suitable shoulders formed on the periphery of said plungers and in the bore of the companion wedges 172, 172a is a pair of compression springs 179, 179a. Each of these springs, when fully expanded as in Fig. 7, is under an initial heavy tension, but is restrained against any further expansion by the limiting pins 173, 173a aforesaid. This construction enables each plunger to impose a heavy thrust against its companion wedge, but permits said wedge to lag slightly behind (as shown in Fig. 8) in the event that an unduly heavy opposition to movement of the wedge is encountered.

Each wedge actuates a pair of gripping levers 175, 176 and 175a, 176a, which are centrally fulcrumed on the tailstock 104 on upper pivot pins 177, 177a and lower pivot pins 178, 178a. The outer ends of said levers are resiliently urged toward each other by a pair of companion tension springs 180, 180a, while the inner ends of said levers are provided with upper gripping jaws 181, 181a and lower gripping jaws 182, 182a. These jaws are secured to their companion gripping levers by upper holding screws 183, 183a and lower holding screws 184, 184a.

The lower jaws 182, 182a have flat, upper gripping faces which are adapted to bear against flattened portions 185, 185a that are formed on the under face of the tap shank 95. This prevents the tap from rotating when either one or both of the pairs of gripping jaws are closed. The faces of the upper jaws 181, 181a are of concave, longitudinally cylindrical form so as to get a firm grip on the annular peripheral surface of the tap shank, and to hold the same in accurate lateral alignment. The use of this cylindrical face on only the upper jaws is also of advantage in the construction of the machine, as this face may be accurately aligned with the axis of the chuck 55 and then the lower flat faced jaws 182, 182a brought up to bear on the lower flattened portions 185, 185a of the tap shank.

In actual practice the shanks of a tap are frequently found to be not absolutely straight. In such a case, if the upper jaws 181, 181a are in perfect alignment, one end of the tap shank will be forced to move laterally every time it is gripped by one pair of jaws while still being gripped by the other pair of jaws. Such an action is obviously not desirable, and has been remedied in the present invention by leaving enough space between the sides of the upper jaws 181, 181a and the inner faces of the cheeks 186, 186a of the upper gripping levers 175, 175a, that said upper jaws may be positioned obliquely to properly seize a tap shank which is not perfectly straight. To effect this adjustment when the operation of the machine indicates its desirability, the operator slacks off the holding screw (183 or 183a) of one of the upper jaws 181, 181a and then grips the tap in the other pair of jaws. He then closes the first pair of jaws and moves the loose upper jaw until it snugly fits the shank of the tap, positioning said upper jaw obliquely if this is desirable. In addition to this, he may, if it be desirable, move said loose upper jaw laterally and/or shim it up or down, and even tilt it one way or the other by using suitable wedge shaped shims. The openings in the upper gripping lever through which the holding screws 183, 183a pass are, of course, sufficiently large to permit of such a manipulation of the loose upper jaw relatively to its upper gripping lever. The operator then tightens the loose, upper holding screw (183 or 183a as the case may be) which he had previously slacked off, and the machine will then operate satisfactorily even though it is employing a bent tap.

It is very important that the tap be gripped firmly by each pair of clamping jaws, to ensure that the tendency of the tap to twist does not cause a force which tends to retract either of the wedges when its companion gripping jaws are in closed position. This result has been obtained in the present invention by having the final slope 187, 187a of the wedges disposed at approximately eight degrees to the axis of the wedge. Any slope appreciably greater than this will cause a force tending to retract the wedge greater than the frictional resistance which opposes this movement and which results from the frictional contact between the outer curved ends of the gripping fingers and the wedges.

This question only applies to the final slope of the wedge, inasmuch as it is only when the gripping levers are substantially in the closed position of Fig. 8 that the rotative force of the tap can have any effect upon the companion wedge of said gripping fingers. Hence the leading slope of each wedge may be very steep, as, for instance, the curved 45 degree slope shown in the drawings.

It is to be noted that the centering tongues or noses 188, 188a of the wedges have substantially parallel upper and lower faces, and also that the wedges are never retracted beyond the position of Fig. 7. This arrangement positively prevents either gripping lever from moving into the path of the wedge, and also permits the wedges to be operated quietly. In addition to this, the gripping levers, because of their long straight noses 188, 188a, may be very conveniently arranged to open at a uniformly accelerated rate of movement by gently merging the curve of the leading slope of the wedge into the flat faces of said noses. Such a uniformly accelerated movement is much more difficult of practicable accomplishment when there is no nose 188, 188a to separate the gripping levers at the time when the wedges are in their retracted position.

The operation of the gripping jaws is such that at no time is the tap held by less than one pair of gripping jaws. To accomplish this in a positive manner it is necessary that the action of the gripping jaws overlap each other to a certain extent, i. e., at one time in the cycle of operations both gripping jaws are in gripping engagement with the shank of the tap;—then one pair of the gripping jaws is opened;—and this pair is caused to again grip the shank of the tap before the other pair of gripping jaws is opened. The correct synchronism of this alternate movement is reliably taken care of by the one sewing machine cam 165 which actuates both pairs of gripping levers.

When it is desired to remove a tap which requires regrinding or replacement it is necessary to have both pairs of gripping jaws open. To accomplish this result the whole machine is first stopped at a point where the front pair of gripping jaws 181, 182 are open. At this time the rear gripping jaws 181a, 182a are closed. To open the latter pair of gripping jaws, the operator slacks off the holddown screw 190 which is threaded vertically in the upper part of the tailstock 104 and which normally bears downwardly upon a stop arm 191 secured to the pivot pin 177a of the rear, upper gripping lever 175a. This particular pivot pin is different from the other gripping lever pivot pins 177, 178 and 178a in that it is provided with a central eccentric portion 192, (see Fig. 9) so that when aforesaid holddown screw 190 is slacked off and said pivot pin or eccentric pin 177a is partially rotated manually by the hand lever 193 in a counterclockwise direction (as viewed in Fig. 8) the central fulcrum of the upper rear gripping lever 175a is lifted and its companion jaw 181a freed from the tap. The latter is then free to be removed. To replace the new or reground tap, this whole process is, of course, reversed.

Stripping mechanism

Pivoted on vertical pivot pins arranged in the stripper carriage 125 are two pairs of stripping fingers, namely a front pair of stripping fingers 193, 194 and a rear pair of stripping fingers 193a, 194a. When the stripper carriage moves forwardly (to the left in Figs. 6, 11 and 15–19) each pair of stripping fingers is thrown to its open or disengaged position, whenever its companion gripping jaws 181, 182 and 181a, 182a are closed. This is because, when said gripping jaws are closed, the cheeks 186 or 186a, as the case may be, of the companion upper gripping lever (175 or 175a) stand in the path of their companion pair of stripping fingers. When, however, either pair of gripping jaws is opened, the cheeks (186 or 186a) of their companion upper gripping lever are elevated out of the path of said stripping fingers and the latter are enabled to engage with whatever nuts lie in their path on the rearward stroke of the carriage 125.

In Fig. 15 is shown (diagrammatically) the stripper carriage 125 in its retracted or forward position. In this position the dividing finger 111 has just finished dividing a group 196 of threaded nuts 112 (the group shown consists of two nuts) away from the row of threaded nuts on the tap shank, and has pushed this group of two nuts against the stiff resilient stop 163. Also it has left a gap between this pair or group of nuts 196 and the rest of the row of nuts on the tap shank. In this Fig. 15, the front pair of stripping lever cheeks 186 are shown in dotted lines, which indicates that they are open, while the rear pair of stripping lever cheeks 186a are closed. In this position, therefore, the tap shank is being gripped only by the rear pair of gripping jaws 181a, 182a.

In this Fig. 15 the primary stripping fingers 193, 194 have just rotated into their closed position under the influence of their individual compression springs 198 and 198a and against their stop pins 200, 200a. They have thus swung into the path of the nuts on the tap shank (see also Fig. 10) and into the gap lying just forwardly of the group of two nuts 196 which has been pushed against the stiff resilient stop 163. Because of this gap, the primary stripping fingers 193, 194 are enabled to positively and reliably move to a position which is forwardly of this group of nuts 196 just referred to, and thereby positively move said group of nuts rearwardly.

The stripper carriage 125 now moves rearwardly to the position of Fig. 16, causing said group of two nuts 196 to be forced by the primary stripping fingers 193, 194 past the resilient stop 163 (which is too weak to resist this movement) and past the primary gripping jaws 181, 182, to the position shown, which is just forwardly of the second pair of gripping jaws 181a, 182a.

The primary gripping jaws 181, 182 now close, and the tap shank 95 is now gripped by both pairs of gripping jaws, as shown in Fig. 16. The next movement of the stripper carriage 125 is an idle movement, as far as the primary stripping fingers 193, 194 are concerned. This movement does, however, actuate the dividing finger 111, as will be apparent.

The rear or secondary gripping jaws 181a, 182a are now caused to open, as shown in Fig. 17. This enables the rear or secondary stripping fingers 193a, 194a to close a short distance behind the group of nuts 196, so that when the said secondary stripping fingers are moved rearwardly with the stripper carriage to the position of Fig. 18, they slide this group of nuts 196 past the rear gripping jaws 181a, 182a and off the tail end of the shank of the tap, as shown, from whence they fall through a chute 197 out of the machine.

As actually manufactured, the machine is so constructed, that the dividing finger 111 makes one stroke to every one stroke of the stripping carriage 125. But, each pair of stripping fingers is idle on each rearward carriage stroke because of the interference with said fingers of the cheeks 186, 186a of the upper clamping levers 175, 175a. Hence, the dividing finger 111 makes two strokes for every one effective stroke of the stripping fingers. For instance in Fig. 15 the dividing finger 111 has just brought the group of two nuts 196 up against the stiff resilient stop 163, this having been effected during the previous idle stroke of the primary stripping fingers 193, 194 and the active, rearward stroke of the secondary stripping fingers 193a, 194a. Then, while the carriage moves rearwardly and the primary stripping fingers 193, 194 move the group of two nuts to a position just in front of the second gripping jaws (Fig. 16), the dividing finger has picked up whatever quantity of nuts it was able, which in this particular case is the single nut 201. The next stroke of the carriage 125 is idle as far as the primary stripping fingers 193, 194 are concerned, but it will be noted that the dividing finger 111 has not been idle during this stroke, having picked up two more nuts 202 and added them to the single nut 201 to form a group of these nuts (see Fig. 18) which is analogous to the group 196 of two nuts of Fig. 15.

*Figs. 20-22*

These figures illustrate a modified form of dividing mechanism. In this case the rock arm 108 of Figs. 1-19 has been eliminated and replaced by a carriage 203 which is adapted to slide longitudinally on a pair of horizontal, longitudinal slide bars 204. Said carriage is resiliently urged rearwardly by a pair of compression springs 205 which encircle their companion slide bars 204 and bear at their rear ends against said carriage 203 and at their front ends against a pair of collars 206 secured by set screws 207 to their companion slide bars.

Pivoted at 208, 208 to said carriage are a pair of dividing or starting fingers 111.1 which are disposed on opposite sides of the tap shank 95.1 in a horizontal plane. Each of these dividing fingers is resiliently urged by a compression spring into contact with the nuts 112.1 on said tap shank.

Actuation of said carriage is effected by the stripping carriage 125.1 which on every forward stroke bears with its butt plate 162.1 against the rear end of the adjustable thrust screw 210 which is suitably threaded through an ear 211 in the carriage 203 and locked in place by a lock nut 212.

The action of these dividing fingers 111.1 is very similar to the action of the stripping finger 111 of Figs. 1-19 except that the use of these dual stripping fingers 111.1 is somewhat more smooth and positive in action in that any tendency of the nuts to cock on the tap shank 95.1 is much less likely to occur, and the transverse pressures against the "outboard" or front end of the tap are balanced.

*Figs. 23-27*

These figures illustrate, diagrammatically, still another form of dividing finger 111.2. In this case said pair of dividing fingers is formed similarly to the pairs of stripping fingers of Figs. 1-19, and is similarly pivoted to a companion leg 126.2, 127.2 of a stripper carriage 125.2. In this type of construction, however, it has been deemed advisable to provide additional means of ensuring that the primary stripping fingers 193.2, 194.2 will close in a gap located in front of the group of nuts 196.2 about to be pushed rearwardly by said primary stripping fingers. This means consists of a detaining spring 213, which is located in front of, and is similar in construction to, the resilient stop 163.2, and is adapted to prevent any nut or nuts from being moved rearwardly except such as have been very securely grasped by the dividing fingers 111.2. It has been found in actual practice that all types of dividing fingers will occasionally get a weak grip on one certain nut, and in such an event, said weakly gripped nut may be moved forwardly just far enough to interfere with the primary stripping fingers 193.2, 194.2 opening in a gap or vacant space behind the group of nuts 196.2 to be moved. By the use of the detaining spring 213, any such insecurely held nut is restrained against further rearward movement and is freed from the dividing fingers 111.2 and is then retracted forwardly by said dividing fingers as the latter return in a forward direction with the stripping carriage 125.2.

By this arrangement any nuts moved rearwardly by the dividing fingers 111.2 are either positively moved into the space between the detaining spring 213 and resilient stop 163.2, or are returned in a forward direction to the row of nuts on the front end of the shank of the tap.

Figure 23:
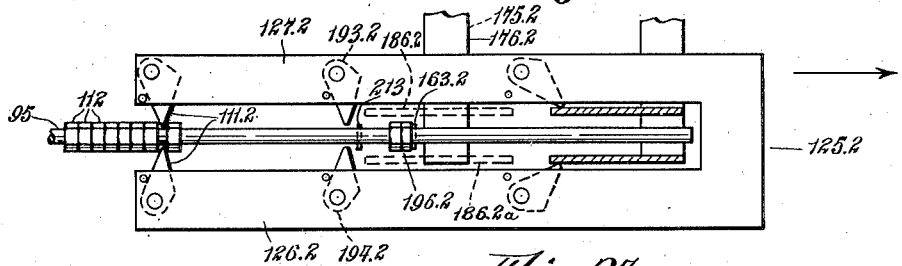
Figure 24:
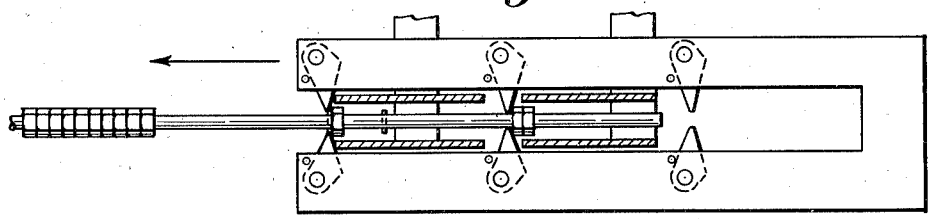
Figure 25:
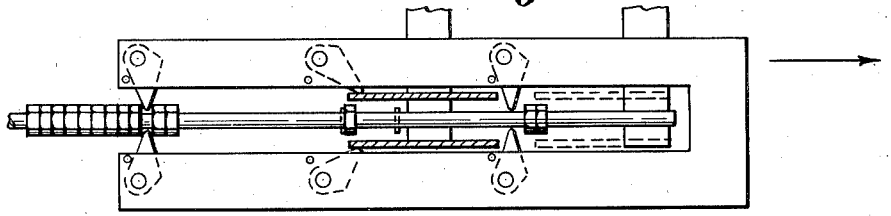
Figure 26:
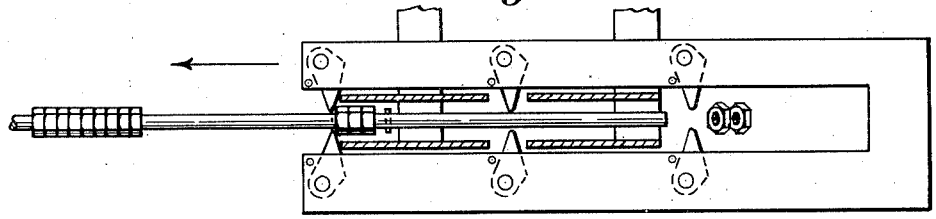
Figure 27:
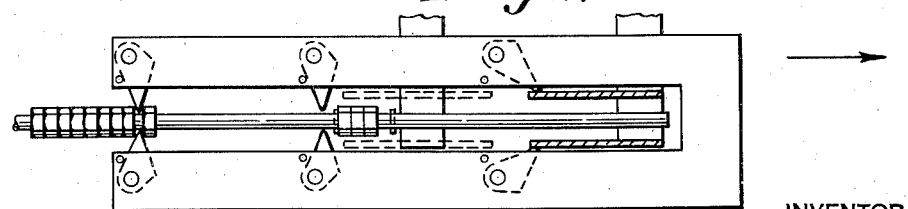

Hence when the stripping carriage 125.2 moves from the position of Fig. 23 to that of Fig. 24, the primary stripping fingers 193.2, 194.2 are enabled to reliably close in a gap located forward of the group of nuts 196.2 and to positively move them rearwardly past the open primary gripping levers 175.2, 176.2 and in front of the closed secondary gripping levers.

It is to be understood that when once the primary stripping fingers 193.2, 194.2 have positively engaged the front face of the group of nuts 196.2, no trouble is experienced by the secondary stripping fingers, inasmuch as the required gap or vacant space has already been formed, and the machine is designed so that the strokes of the two pairs of stripping fingers overlap each other sufficiently to ensure continuous, high speed and reliable movement of the groups of nuts along the tap shank.

These diagrammatic Figs. 23–27, similarly to diagrammatic Figs. 15–19, illustrate how the dividing fingers 111.2 make two effective strokes for every one effective stroke of the stripping fingers. For instance in the rearward stroke of the stripping carriage from Fig. 23 to Fig. 24 only one nut was moved rearwardly by the dividing fingers 111.2 past the detaining spring 213. Then the next rearward stroke from Fig. 25 to Fig. 26 moved two nuts rearwardly past said detaining spring, making, in this case, a group of three nuts to be carried rearwardly by the stripping fingers instead of the group 196.2 of two nuts which were moved rearwardly by the stripping fingers during the previous cycle of operations.

In this construction, just as in the construction of Figs. 1–19, each pair of stripping fingers is prevented from engaging with whatever nuts are positioned forward of their companion pair of gripping levers by the cheeks 186.2 and 186.2a of said levers.

Figs. 28–32

These figures illustrate a modified form of pusher actuating mechanism, replacing the curvilinear heart-shaped cam 70 of Fig. 2, by a pair of straight faced cams 70.3. These cams are secured by a pair of bolts 214 to a drive carriage 215 which is vertically slidable on a pair of slide bars 216. The latter are secured in upper and lower brackets 217, 218 of the main frame 40.3 of the machine, and are held in place by upper and lower binding nuts 220, 221.

Slidably arranged on a horizontal longitudinal axis in the upper front part of the machine is the usual pusher sleeve 74.3 upon which is mounted a pair of thrust, anti-friction rollers 71.3. The latter engage the rear surfaces 222 and 223 of the cams 70.3 and cause the pusher sleeve to reciprocate back and forth as the carriage 215 is moved up and down, retraction of the pusher carriage being effected by a suitably compression spring 84.3. When said carriage commences to rise, the rollers 71.3 are in contact with the upper flat surfaces 222 of the cams 70.3. These surfaces are very steep, and hence the rearward movement of the pusher carriage 74.3 is very rapid. This causes the pusher 61.3 to rapidly move the lowermost nut from the vertical alignment channel 60.3 to the front end of the threaded bit of the tap (not shown). The rollers 71.3 then come into contact with the lower straight cam faces 223 of the cams 70.3 and, as these faces are much more steeply pitched than the upper cam faces 222, it follows that the pusher 61.3 is caused to now move slowly, rearwardly so as to effect a proper rate of cutting speed. It is evident that the cams 70.3, because of their flat faces 222 and 223, can be so machined as to provide both a very rapid initial rearward movement of the pusher, and an extremely accurate cutting movement of said pusher.

Secured to and depending from the drive carriage 215 is a rack 224 which meshes with a pinion gear 225 rotatably mounted on a shaft 226 which is journaled horizontally and transversely on the machine. This shaft 226 is constantly driven in one direction by the main driven pulley wheel 45.3 by intermediate gearing which is deemed not necessary to be illustrated. Secured to said shaft by a transverse pin 227 is a drive collar 228 which is rotatably connected through splines 229 with a clutch collar 230, having ratchet-shaped clutch teeth 231 at its inner, vertical end. These teeth are adapted to engage with an annular row of similar ratchet-shaped, driven clutch teeth formed on the adjacent end of the hub 232 of the pinion 225. Thus as the clutch collar 230 is moved to the right, as viewed in Fig. 29, its driving clutch teeth 231 engage with the clutch teeth of the pinion hub 232 and cause the pinion gear 225 to drive the rack 224 and the drive carriage 215 upwardly. When said clutch collar 230 is moved to the left, as seen in Fig. 29, the lifting force upon said drive carriage 215 is released and said carriage is jerked downwardly by a pair of suitably arranged tension, return springs 84.3.

Formed centrally on the clutch collar 230 is a pair of annular flanges 234, 235 between which is received a roller 236. The latter is journaled on the upper arm of a bifurcated bell crank 237 which is fulcrumed at 238 on the main frame 40.3 of the machine. Pivoted at 239 to the horizontal arm of said bell crank 237 is a yoke 240. The latter is secured by a pin 241 to the lower end of a vertical control screw 242 which is vertically movable relatively to the main frame 40.3 of the machine, being somewhat loosely received at its upper end within a slide bearing 243 arranged in said main frame 40.3. This screw has two limiting positions, an upper position when the driving clutch teeth 231 are disengaged, and a lower position when said clutch teeth are engaged. This screw 242 is resiliently held in either its upper or lower position by a suitable pawl 244 actuated by a compression spring 245, and having a pointed nose which is adapted to engage with either an upper notch 246 or a lower notch 247 formed in the upper end of the screw.

Adjustably threaded on said screw 242 is a pair of actuating nuts 248 and 249 which are suitably locked in place by lock nuts 250 and 251. Said actuating nuts 248 and 249 are adapted to come into contact with a lug 252 which is formed on the drive carriage 215. When this lug moves up and strikes the upper actuating nut 248, it lifts the control screw 242 and disengages the power. Then when the drive carriage 215 is jerked down by its tension springs 84.3 said lug 252 strikes the lower actuating nut 249 and engages the drive to again elevate the drive carriage 215.

Should any part of this mechanism or any other mechanism on the machine become jammed, the power to the entire machine is cut off, by a friction actuated safety clutch 253. The latter is mounted on the main drive shaft 41.3 of the machine and frictionally connects the hub of the driven pulley wheel 45.3 to said drive shaft 41.3 through the instrumentality of a compression spring 254 which serves to provide the necessary frictional resistance.

Figs. 33–35

These figures illustrate a modified form of stripper carriage actuation, which dispenses with the rather costly and hard-to-adjust sewing machines cam 134 of Figs. 1–19. In the construction of the Figs. 33–35, all the power from the driven cross shaft 141.4 to the stripper carriage 125.4 is transmitted through annular shafts and pivots, any or all of which may, if desired, be of the ball or roller bearing type and hence never require adjustment if sufficiently large to carry the loads imposed upon them.

Secured to the outer end of the driven cross shaft 141.4 is a disk 255 having a crank pin 256. Pivoted at its one end on said crank pin is a link or connecting rod 257 the other end of which is pivoted at 258 to the acute-angled bell crank 260. The latter is fulcrumed at 261 on the main frame 40.4 of the machine. The upper arm of said bell crank is bifurcated to slidably receive a square-shaped rocking block 262 which is centrally pivoted on a horizontal, transverse pivot post 263. The latter is threaded at its inner end into the one leg 126.4 of the stripper carriage 125.4 and is secured in place by a vertical pin 264 (see Fig. 35).

By the use of such an acute-angled bell crank 260, the stripper carriage 125.4 may be very effectively driven even though the cross shaft 141.4, from which it received its power, is located only a very short distance below it.

Figs. 36–37

The rear cutting oil nozzle 96 of Fig. 11 has proven very satisfactory in supplying the rear face of the nut being tapped with a large body of cutting oil under high pressure. However it has been noted that the stream of cutting oil from this nozzle 96 is excessively interrupted by the nuts which have been already threaded and are positioned just back of the threaded bit 58 of the tap.

In the present construction of Figs. 36–37, this interference to the flow of rear cutting oil has been eliminated.

In the first place the number of chuck arms 56.5 has been reduced to two.

In addition to this the advancing face of each chuck arm 56.5 has been dished at 265 so that even though the cutting oil nozzle 96.5 carries the cutting oil in radially, it is not thrown out by centrifugal force by the chuck arms 56.5 because this dished surface scoops in the cutting oil centripetally and offsets the centrifugal force set up by the rotation of the cutting oil with the chuck.

The nozzle 96.5 is preferably so aimed that the maximum amount of cutting oil is forced against the rear face of the nut 57.5 being tapped, at just the moment when the maximum cutting operation is being effected. This has been illustrated diagrammatically by the oil flow line 266 which shows the oil being directed directly into the corner between the rear face of the nut and the periphery of the bit just as the nut is moving to the point where the threads of the tap bit are of maximum diameter.

It is also to be noted that in this form of the invention, the nut engaging faces of the chuck arms 56.5 do not contact with the extreme corners 267 of the nut. Hence there is no liability of damaging these relatively weak corners 267 when the tapping operation is being effected at very high speed and the torsional stresses between chuck and nut are very great.

One advantage of such a two-jawed chuck is that either square or hexagonal nuts of the same thread size can be handled by the same chuck arms. This is possible because the distance between the flats of a square and a hexagonal nut are the same for any certain thread size. It is obvious that a three-jawed chuck does not have this feature.

Another feature of such a two-jawed chuck is that the nut being tapped is given the maximum possible amount of lateral freedom of movement and yet not subjected to any unbalanced lateral forces.

Figs. 38–39

These figures illustrate a modification of the two-jawed chuck of Figs. 36–37. It is obvious that the dished faces 265 of the chuck of Figs. 36–37 are expensive to machine, and where a lower grade of tapping is satisfactory the flat form of face 265.5 shown in Figs. 36–39 may be employed. It is to be noted, however, that these flat faces also impose a centripetal force on the cutting oil as they are sloped in an undercut direction. Preferably this direction is such that the chuck arms 56.6 do not contact the relatively sharp corners 267.6 of the nut. However, if it is desired to provide very copious quantities of cutting oil, the undercut faces 265.6 may extend in a more undercut direction in a plane with the driving faces 268 of the chuck arms.

Fig. 39 illustrates how the cutting oil is adequately supplied to the nut 57.6 being tapped, before it has reached the more rearward position shown in Fig. 37. When the nut is positioned as in Fig. 39, the cutting oil first moves inwardly just as in Fig. 37, and then hits the threaded bit 58.6 of the tap and flows longitudinally along its periphery, and finally strikes the rear face of the nut with a heavy direct-hitting impact which effectively carries away the chips as fast as they are formed. When the tap is cutting long spiral chips this heavy flow of cutting oil flows past these threads directly to the cutting corners of the tap bit.

We claim as our invention:

1. A nut tapping machine comprising: a frame; a tap arranged in said frame; a chuck having driving arms whose leading faces are dished in a plane which is transverse of the axis of rotation of said chuck; and means for rotating said chuck relatively to said tap.

2. A nut tapping machine comprising: a frame; a tap; a chuck; means for rotating said chuck relatively to said tap; a dividing finger and means for moving the same longitudinally relatively to the tap so as to move the nuts along said tap; and a resilient stop adapted to arrest the momentum of nuts moved by said dividing finger.

3. A nut tapping machine comprising: a frame; a tap; a chuck; means for rotating said chuck relatively to said tap; a dividing finger and means for moving the same longitudinally relatively to the tap so as to move the nuts along said tap; a gripping jaw adapted to periodically grip said tap; and a resilient stop disposed in front of said jaw and adapted to arrest the momentum of nuts moved by said dividing finger before they reach said jaw.

4. A nut tapping machine comprising: a tap having a threaded bit; means for rotating a succession of nuts on said threaded bit and thereby moving said nuts rearwardly to form a row of nuts; a separating finger adapted to separate a nut located at the rear end of said row of nuts and to move said nut rearwardly; means for retracting said separating finger to form a vacant space in front of said separated nut; and a stripping finger adapted to open forwardly of said nut in the vacant space thus formed and to thereafter move said nut still further rearwardly; and a gripping jaw adapted to periodically grip said tap.

5. A nut tapping machine comprising: a tap having a threading bit and a shank; means for rotating a succession of nuts on said threaded bit and thereby moving said nuts successively lengthwise of said bit; a primary stripping finger adapted to move a leading nut along said shank at a higher rate of speed than it was moved along the bit and to thereby form a gap in the row of nuts passing off from said bit; a secondary stripping finger; and means for thrusting said secondary stripping finger into the gap thus formed and to thereafter move rearwardly so that whatever nuts are positioned rearwardly of said secondary stripping finger are positively moved rearwardly.

6. A nut tapping machine comprising: a tap having a threading bit and a shank; means for rotating a succession of nuts on said threaded bit and thereby moving said nuts successively lengthwise of said bit; a primary stripping finger adapted to move a leading nut along said shank and having a definite longitudinal stroke of movement; and a secondary stripping finger adapted to thereafter longitudinally move said nut still further along said shank, the stroke of said secondary finger overlapping the stroke of said primary finger.

7. A nut tapping machine comprising: a tap having a threading bit and a shank; means for rotating a succession of nuts on said threaded bit and thereby moving said nuts successively lengthwise of said bit; a primary stripping finger adapted to move a leading nut along said shank at a higher rate of speed than it was moved along the bit and to thereby form a gap in the row of nuts passing off from said bit; a secondary stripping finger; and means for thrusting said secondary stripping finger into the gap thus formed and to thereafter move rearwardly, so that whatever nuts are positioned rearwardly of said secondary stripping finger are positively moved rearwardly, the stroke of said secondary finger overlapping the stroke of said primary finger.

8. A tapping machine comprising: a frame; a tap; a chuck; means for rotating said chuck relatively to said tap; a gripping lever having a flat face disposed parallel to the axis of the tap; and a jaw secured to said lever and having a flat face which bears against the flat face of said gripping lever and is adjustable relatively thereto in a plane which is parallel to the axis of the tap.

9. A tapping machine comprising: a frame; a tap; a chuck; means for rotating said chuck relatively to said tap; a stripper carriage longitudinally slidable in said frame; a lever fulcrumed on said frame; a crank shaft journaled in said frame intermediately of said stripper carriage and the fulcrum of said lever and having a crank pin; a link connecting one end of said lever with said crank pin; and means connecting another point of said lever with said carriage.

10. A nut tapping machine comprising: a frame; a chuck; a tap; means for rotating said chuck relatively to said tap; a stripping finger adapted to move a nut along said tap; a gripping jaw adapted to periodically grip said tap; and a guard cheek connected with said jaw and adapted to throw said stripping finger out of the path of the nuts whenever said jaw is in its closed position.

11. A nut tapping machine comprising: a frame; a tap arranged in said frame; a chuck having jaws each of which has a flat face adapted to bear against one end of one of the faces of the nut, the leading edge of said flat face of a jaw being adapted to be positioned slightly rearwardly of the front edge of the companion face of the nut; and means for rotating said chuck relatively to said tap.

12. A machine for threading screw nuts comprising: a tap having cutters and a shank; a holding mechanism adapted to grasp said shank for preventing the tap from turning; a chuck adapted to rotate the nuts relative to the cutters of the tap; a propelling mechanism for moving the nuts off said shank and past said holding mechanism including starting means which operate to divide the column of nuts on said shank into a first group arranged in rear of said tap cutters and a second group arranged in front of said tap holding mechanism and separated from the first group by an intervening nut-free safety space; and stripping means having parts adapted to enter said safety space and engage the front side of the second group of nuts and move the latter rearwardly past said tap holding mechanism.

13. A machine for threading screw nuts comprising: a tap having cutters and a shank; a tap holding mechanism adapted to grasp said shank for preventing the tap from turning and including front and rear pairs of jaws adapted to alternately grasp the front and rear parts of the shank of said tap, and operating levers carrying said jaws; a chuck adapted to rotate the nuts relative to the cutters of the tap; a propelling mechanism for moving the nuts off said shank and past said holding mechanism including starting fingers which operate to divide the column of nuts on said shank into a first group arranged in rear of said tap cutters and a second group arranged in front of said tap holding mechanism and separated from the first group by an intervening nut-free safety space, and stripping means having front stripping fingers adapted to enter said safety space and engage the front side of the second group of nuts and move the latter rearwardly past said front jaws of the tap holding mechanism; a longitudinally reciprocating carriage having parts which are arranged between the respective levers of both of said pairs and carrying said front fingers, and rear stripping fingers mounted on said carriage and adapted to engage with the front sides of the nuts on said tap shank and move the same lengthwise past said rear pair of jaws and off the tap shank.

JOSEPH WERNER.
GEORGE KROUPSKY.